United States Patent [19]

Robinson

[11] 4,131,391

[45] Dec. 26, 1978

[54] ROTOR HUB AND OIL SEAL

[75] Inventor: Frank D. Robinson, Rancho Palos Verdes, Calif.

[73] Assignee: Robinson Helicopter Co., Torrance, Calif.

[21] Appl. No.: 729,162

[22] Filed: Oct. 4, 1976

[51] Int. Cl.² .............................................. B64C 27/36
[52] U.S. Cl. .............................. 416/140; 416/146 A; 416/148
[58] Field of Search ................... 416/102, 103, 146 A, 416/104, 138 A, 141, 106, 107, 136, 147, 148, 114, 140 A

[56] References Cited

U.S. PATENT DOCUMENTS

| 3,942,910 | 3/1976 | Snyder et al. | 416/141 |
| 3,967,918 | 7/1976 | Mouille et al. | 416/141 |

Primary Examiner—Everette A. Powell, Jr.
Attorney, Agent, or Firm—Smyth, Pavitt, Siegemund, Jones & Martella

[57] ABSTRACT

An improved rotor hub and seal assembly for a rotorcraft such as a helicopter includes an improved tri-hinge rotor and an improved oil seal assembly for the rotor pitch bearings. The rotor blades are mounted to the underslung hub by coning hinges, offset from the teetering hinge to which the rotor shaft is attached, so that the stabilizing centrifugal force is always greater than the destabilizing moments. The rotor also includes a teeter hinge restraint, while the oil pitch bearings are sealed by a boot-type seal to permit angular movement of the outer blade root housing relative to the bearing spindle resulting in shear rather than tension on the boot.

6 Claims, 9 Drawing Figures

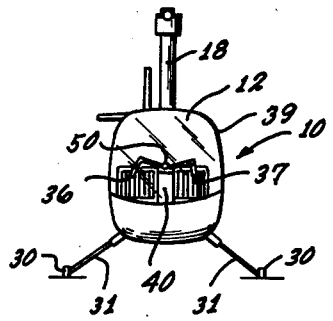
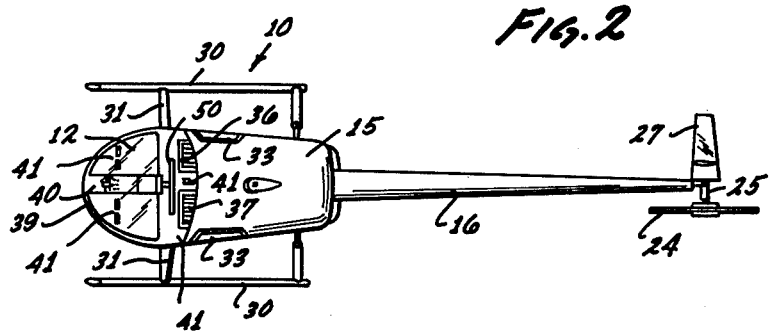
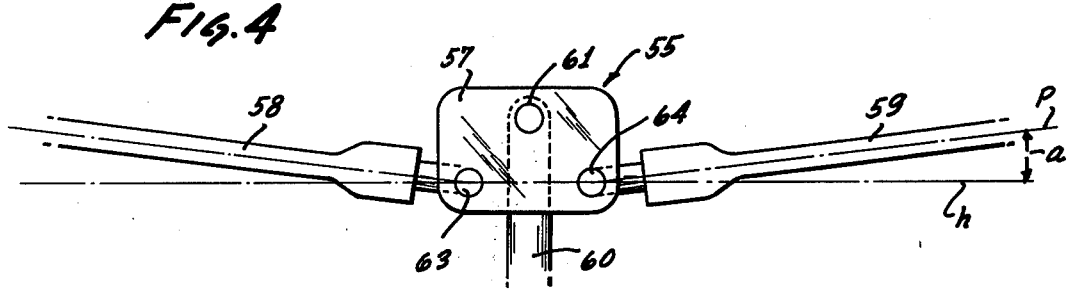
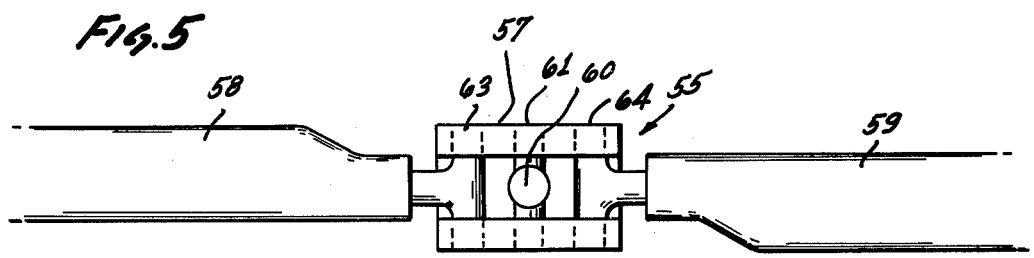

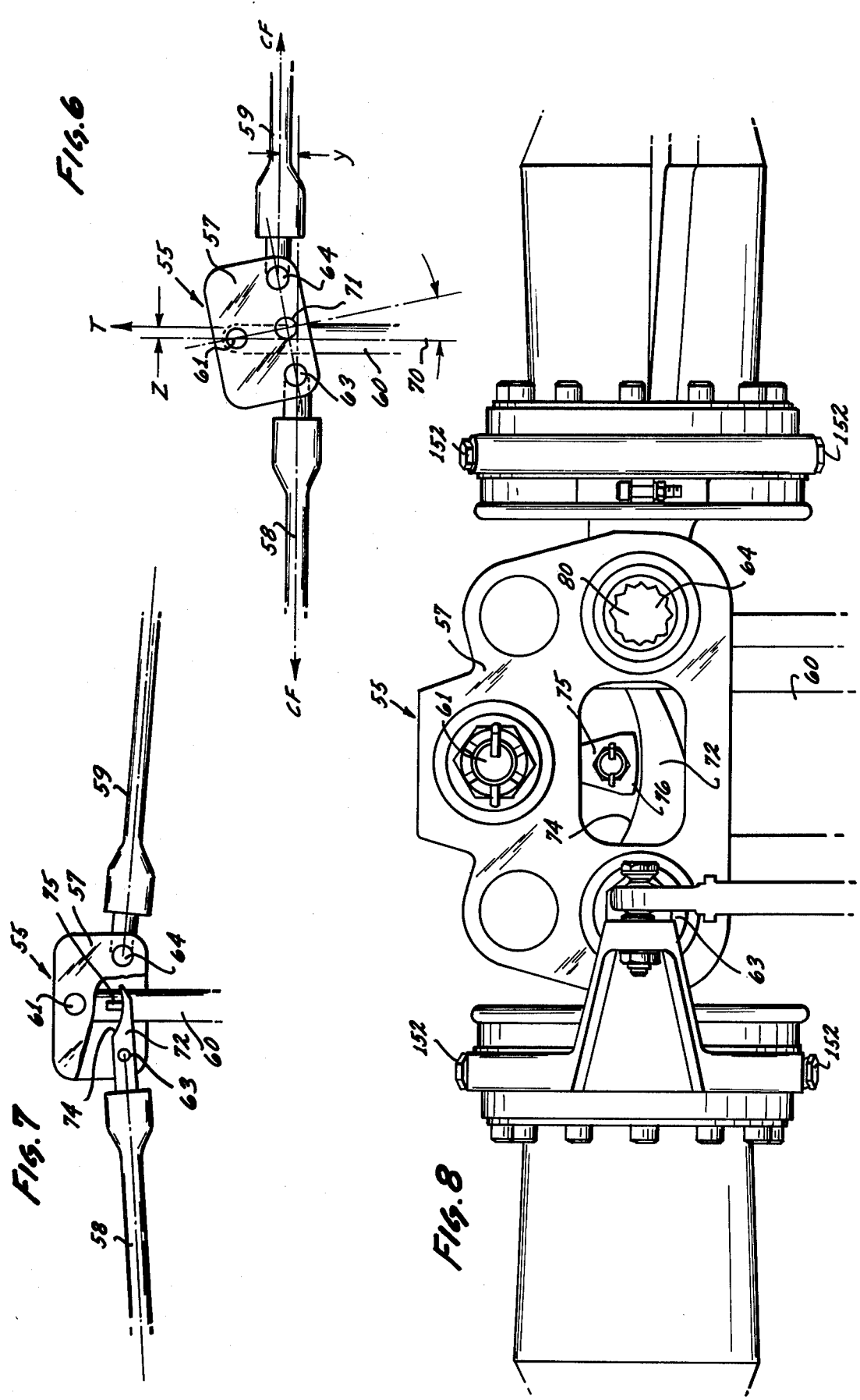

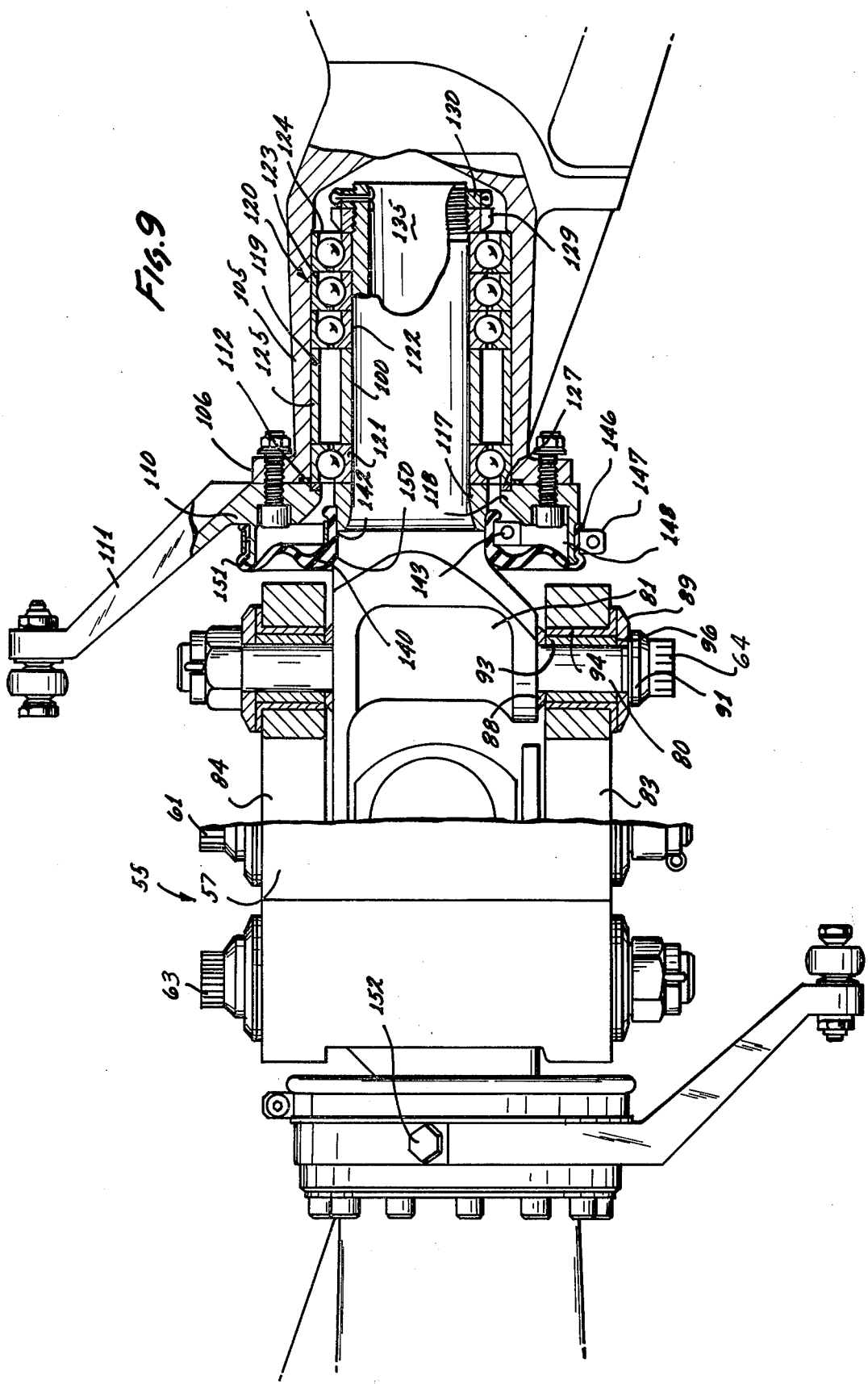

ROTOR HUB AND OIL SEAL

BACKGROUND OF THE INVENTION

This invention relates to a rotor hub and seal assembly for rotorcraft and more particularly to an improved rotor hub and seal assembly including an improved tri-hinge rotor hub and an improved oil seal for the rotor pitch bearings.

PRIOR ART

In rotorcraft, especially helicopters of the two bladed variety, the existing rotor hubs are connected to the rotor drive shaft and usually have a fixed or built-in coning angle. In coning, the blades each move in the same direction, e.g. up or down. The coning angle is usually chosen so as to place the combined center of gravity of the rotor blades and rotor hub at or near the teeter hinge, i.e. the hinge connection between the hub and the rotor drive shaft which lets the hub tilt relative to the drive shaft. Teetering is a motion of the blades which is differential, e.g. one blade moves oppositely from the other. The rotor blades are attached to the hub so as to be fixed and non-pivotal relative to the hub, which moves in a tilting motion through tilting to effect differential movement of the blades. Such an arrangement is known as an underslung rotor hub, i.e. the blades are fixed to the hub below the teeter hinge.

If the blades are not underslung in a two bladed rotor, the result is what is called rotor shaft or rotor mast shake. To avoid mast shake, which shakes the entire aircraft, the rotors of a two-bladed helicopter are underslung by using a teeter hinge on the hub.

The teeter hinge is the hinge about which the rotor tilts back and forth once for each revolution whenever the rotor plane is not normal to the rotor drive shaft centerline.

As is well known in the helicopter industry, if the center of gravity of the rotor is not on the teeter hinge, i.e. the hub is not underslung, the result is that as the rotor tilts or see-saws back and forth, the center of gravity of the rotor will move on and off the shaft axis of rotation twice for each revolution of the blades. This movement produces a twice-per-revolution shake in the helicopter and therefore is the primary reason for underslinging two-bladed rotors.

It has usually been assumed that underslung two-bladed rotors must have fixed coning angles to be stable. A fixed coning angle, however, requires that sizeable moments be transferred across the hub whenever the ratio of rotor thrust to blade centrifugal force is different from the ratio used to select the fixed coning angle. As a practical matter, these moments occur whenever there is a variation in the rotorcraft weight, rotor speed, or accelerations due to maneuvering. These moments produce high stresses in the rotor blades and pitch change bearings as well as the hub, each of which must be designed and constructed to withstand the high stresses produced by the moments.

These moments also cause the rotor blade to bend out of its plane of rotation so that the tip of the blade is no longer on the pitch change axis of the blade. In-plane or chordwise forces on the blade will then produce moments about the pitch change axis which, in turn, must be reacted by the control system and is the principal cause of control system feedback or "stick shake".

With conventional two-blade rotors there is a tendency for the rotor to teeter or see-saw whenever the rotor is starting or stopping its rotation. This form of teetering is particularly severe when the rotor is started or stopped in the wind. As the blades teeter they impact their teeter stops and shake the entire helicopter. Also, the teetering blades may dive very low and, on many occasions, have struck people, killing or seriously injuring them.

Additionally, the rotor blade is supported by ball bearings or roller bearings so that the blade is free to move angularly as required for changing the pitch of the blade. In prior structures, these bearings have been grease lubricated and sealed by conventional sliding or lip type seals. Pitch changes of the blades usually require angular motion which is small but of high frequency. Thus, as the balls or rollers rock back and forth, they roll the lubricant out of the contact area and fretting corrosion can occur.

Moreover, air and oxygen present in the bearing cavity tend to promote fretting corrosion. For this reason, it has been the practice to relubricate the bearings at very short intervals.

As will be apparent, the prior structures may be improved substantially to provide a structure which offers the advantages of relatively simple structure, avoidance of complex mechanism, reliability as well as light weight and reduced costs. The improved rotor hub and seal of this invention solves many of the problems discussed above.

SUMMARY OF THE INVENTION

By the present invention, an improved rotor and hub assembly is provided which includes an improved tri-hinge underslung rotor hub for two-bladed rotorcraft and an improved oil seal for the pitch bearings.

Thus, in accordance with this invention, the improved hub is underslung like existing hubs, but also provides individual coning hinges for each blade.

The hub is stabilized relative to the rotor plane by having the individual coning hinges offset to either side from the hub center so that if the hub tilts relative to the plane of the rotor a centrifugal force couple is produced on the hub by the opposing blades which tends to realign the hub with the rotor plane.

With this invention, the two coning hinges are offset a sufficient distance so that the stabilizing centrifugal moment is always greater than the destabilizing moments. One destabilizing moment is due to the offset of the rotor thrust vector from the teeter hinge. The other destabilizing moment is due to the centrifugal force created by moving the center-of-gravity of the rotor off the center of rotation.

The structure herein described eliminates or reduces the moments transferred across the hub, pitch change bearings, and the blade itself, by allowing each blade to cone freely and to balance its aerodynamic lift forces with its centrifugal force. This also greatly reduces bending of the rotor blade and allows the pitch change axis to follow closely the blade centerline. This prevents implane forces from producing moments about the blade's pitch change axis which must be reacted by the control system and virtually eliminates or greatly reduces the forces or shake in the cyclic control stick.

The tri-hinge rotor may also incorporate another unique feature, the friction teeter-hinge restraint. The improved friction teeter-hinge restraint of this invention holds the rotor in a level position during stopping or starting, thus eliminating the hazardous conditions previously described. Inboard of the coning hinge for each blade is an arm with a curved upper surface. When the rotor is not turning, the blade tends to droop downward pivoting about its coning hinge. As it droops downward, the arm raises upward and eventually bears against the droop stop which is secured to the rotor shaft. The upper surface of the arm is shaped as an arc about the teeter-hinge, as is the lower surface of the droop stop. Therefore, when the blades are in the droop position, if the rotor teeters about the teeter-hinge, the arm rubs against the stop. This produces a high frictional moment about the teeter-hinge which restrains the rotor from teetering. As soon as the rotor rotational speed is increased sufficiently so that the combination of centrifugal force and aerodynamic lift support the weight of the rotor blade, the arm no longer bears against the stop and the rotor is completely free to teeter during flight. At this point, the aerodynamic forces on the blade are sufficient so that the rotor plane is controlled by the swashplate and the hazardous uncontrolled teetering has ceased.

The improved oil seal for the pitch bearings hermetically seal the bearing housing and the bearings operate completely submerged in lubricating oil. This is accomplished by an elastomeric seal or boot which has one edge clamped to the outer portion of the blade root and the inner edge clamped to the bearing spindle. The oscillating angular motion between the outer housing and the spindle produces pure torsional shear deformation in the boot, which is desirable. By structuring the boot so that only pure shear deformation will occur, there is no wrinkling or chaffing of the elastomeric material against itself. Since the magnitude of the angular travel is limited, a material and geometry for the boot are used which will provide an acceptable fatigue life.

After the boot is installed, the cavity which contains the bearings is completely filled with oil. Any remaining air bubbles are then bled from the housing through a plug after which it is tightly sealed. By eliminating the air and the oxygen from the cavity containing the bearings, the likelihood that fretting corrosion will occur, is very remote.

The flexibility of the elastomeric boot also allows for the thermal expansion and contraction of the oil. Also, since the boot is firmly clamped at both edges, there can be no "breathing" in and out of moisture or dirt, and changes of temperature or barometric pressure, as would occur with a conventional running or lip seal. Also, of course, there is no leakage of the oil with this concept.

It will be apparent from the above brief description that the structures of the present invention represent a new approach to rotor-blade assemblies for rotorcraft, especially two-bladed helicopters Not only is performance increased, but it is accomplished by relatively simple structures which are relatively inexpensive and lightweight.

The above described advantages and others will be apparent from the following detailed description and it will be apparent therefrom that modification, changes and variants may be made within the scope of the appended claims.

BRIEF DESCRIPTION OF DRAWINGS

FIG. 1 is a front view of a helicopter embodying the improved structures of this invention;

FIG. 2 is a plan view of the helicopter shown in FIG. 1;

FIG. 3 is a side view of the helicopter of FIG. 1;

FIG. 4 is a diagrammatic side view of the tri-hinge rotor of this invention;

FIG. 5 is a top view of the structure of FIG. 4;

FIG. 6 is a diagrammatic view for purposes of explanation thereof;

FIG. 7 is a diagrammatic view of the teeter hinge restraint assembly of this invention;

FIG. 8 is a side view of the improved rotor hub and seal assembly of this invention; and FIG. 9 is a top view, partly in section of the rotor hub and seal assembly of this invention.

DETAILED DESCRIPTION OF PREFERRED EMBODIMENT

Referring to the drawings which illustrate a preferred form of the present invention, the improved rotor hub and seal assembly will be discussed with reference to a helicopter, although it is understood that the present invention may be used for aircraft of the rotorcraft type.

As shown in FIGS. 1-3 the aircraft in the form of a helicopter 10 includes a fuselage which houses an engine, full tank, main gear box, belt driven clutch, all located to the rear of the cockpit 12 in an area generally designated 15. Extending from the rear is tail boom assembly 16 while the rotor mast 18 extends the fuselage as shown. The rotor mast encloses the main rotor control rods and rotor shaft while the tail boom has the tail rotor shaft passing through it.

Above the rotor mast is the main rotor head and underslung hub generally designated 20. The hub has a two blade teetering rotor 23 affixed thereto, while the tail rotor shaft is attached to a two blade tail rotor 24 through a tail rotor gear box 25. The tail rotor is mounted opposite a tail assembly 27.

The fuselage is supported off the ground by a landing gear in the form of a landing skid track 30, the forward leg 31 of the skid track being below the doors 33 which provide for entry and egress from the cockpit 12.

Located in the cockpit are dual spaced seats 36, 37 arranged on each side of the center line of the aircraft. The forward portion of the cockpit is covered by a curved clear acrylic windshield 39, as shown, so there is excellent visibility through the windshield and doors. Forward of the seats and in the center of the aircraft is an engine and flight instrument panel 40, each seat being provided with a collective control 41 to the left and floor pedals 43 for rudder control. The collective control each includes conventional throttle twist grips.

Located forward of the seats and aft of the engine and flight panel 40 is an improved control stick assembly 50 described in application Ser. No. 729,161, filed of even date herewith and assigned to the same assignee.

Referring to FIG. 4-6 the improved tri-hinge rotor 55 of the present invention is shown diagrammatically for purposes of explanation. Mounted to the hub 57 are two blades 58 and 59, the hub being hingedly mounted to a rotor shaft 60 by a teeter hinge 61. As shown, each blade 58, 59 is mounted for hinged movement to the hub by a coning hinge 63, 64, respectively, vertically below the teetering hinge 61.

The rotor hub 57 is of the underslung type except that the blades may teeter or cone independently on their respective hinges. In prior structures, the blades were fixed to the hub at some fixed angle, illustrated as a, i.e. the included angle between the horizontal axis h through the connection to the rotor hub and the pitch axis p of the blade. With blades fixed to the hub, in an underslung configuration, the hub and fixed blades tilt as a unit about the teetering hinge. While this eliminates mast shake, it results in stick shake.

By the present invention, stick shake is eliminated, since each blade includes a coning hinge 63, 64 and, in addition to teetering motion of the hub, each blade is free to cone independently. The result is that the pitch axis of the blade, i.e. the axis around which blade moves angularly for pitch, is the same as the center line of the blade.

By comparison, in an underslung rotor in which the blades are not free to tilt relative to the hub, coning of the blades results in actual deflection of the blade upwardly or downwardly so that the actual center line of the blade is displaced from the pitch axis of the blade. The displacement, which usually occurs when there are variations in aircraft weight, rotor speed or during acceleration due to maneuvering, produces stick shake.

By mounting the dual blades so that they teeter on the hub, through the teetering hinge, while providing independent coning of each blade through a coning hinge, the pitch axis and center line of the blade remains the same. To effect this desirable condition, the hub 57 is stabilized relative to the rotor plane by having individual coning hinges 63, 64 offset from the hub center (61) so that if the hub tilts (teeters) relative to the plane of the rotor, a centrifugal force couple is produced on the hub by the opposed blades (58, 59) which tends to realign the hub with the rotor plane.

Referring to FIG. 6, a condition is illustrated which the present invention avoids. If it is assumed that line 70 represents the true axis of rotation, destabilizing moments tend to create a condition in which the center of the rotor 71 is displaced, off the true axis of rotation. One destabilizing moment is due to the offset of the rotor thrust vector from the teeter hinge 61 and is equal to $T \times Z$. The other destabilizing moment is due to the centrifugal force created by moving the center of gravity of the rotor off the center of rotation by a distance Z.

The condition illustrated in FIG. 6 cannot occur, however, since by the present invention, the stabilizing centrifugal moment is always greater than the destabilizing moments for all conditions. Structurally this is achieved by separate coning hinges 63, 64, for each blade, the coning hinges being offset a sufficient distance such that the stabilizing centrifugal moment ($2 \times CF \times y$) is always greater than the destabilizing moments where y is the displacement between the pitch change axes of the opposed rotor blades.

As a result, there is a reduction of the moments transferred across the hub 57, the pitch change bearings (infra) and the blades 58, 59, by allowing each blade to cone freely and balance its aerodynamic lift forces with its centrifugal force. This also reduces substantially the bending of the rotor blade and allows the pitch change axis to follow closely the blade center line. The result is that in-plane (chordwise) forces do not produce moments about the blade's pitch change axis which must be reacted to by the control system, i.e. the stick. This structure, accordingly, greatly reduces or substantially eliminates control stick shake. Moreover, the structure of the hub, pitch change bearings and blades may be simplified.

Another feature of the present invention is illustrated diagrammatically in FIG. 7 and is referred to as the friction teeter-hinge restraint. It is known in conventional two-bladed helicopters that there is a tendency for the rotor to teeter or see-saw whenever the rotor is started or stopped. In wind, the teetering may be severe during starting or stopping.

Thus, as shown in FIG. 7, each blade includes an arm 72 (one being shown) located inboard of the respective coning hinge (63, 64). Each arm includes an upper curved surface 74. Located on the rotor shaft 60 is a stop 75 (one shown) which coacts with the arm 72. When the rotor is at rest, the blade 58 (or 59) droops downward and pivots about the coning hinge and the arm 72 contacts the stop 75.

Referring to FIG. 8, wherein the same reference numerals have been used, where applicable, the arm 72 includes a crescent shaped surface 74 while the lower surface 76 of the stop 75 is complimentarily shaped. Thus, in the droop position of the blade the arm 72 contacts the stop 75 and the two curved surfaces 76-74 are in contact over their opposed faces. Both blades, stops, and arms are in contact. The result is a high frictional moment about the teeter hinge 61 which prevents the rotor from teetering because the friction prevents teetering motion of the hub 57 relative to the shaft 60.

As soon as rotor rotational speed is increased sufficiently for the combined centrifugal force and aerodynamic lift to support the weight of the blade, the arm 72 no longer bears on the stop 75 and the rotor is free to teeter during flight. At this point, the aerodynamic forces on the blade are sufficient so that the rotor plane is controlled by the swash plate and hazardous, uncontrolled teetering is eliminated.

Referring now to FIGS. 8 and 9, the details of the hub structure are shown, and the same reference numerals have been used, where applicable. Each of the blades and associated portions of the hub are of essentially the same structure, so reference will be made to blade 59 and its mounting on the hub.

Coning hinge 64 includes a bolt 80 which passes through apertures in the hub 57 and the bearing spindle 81, the hub 57 being a forging including spaced walls 83 and 84 such that the spindle is received therebetween. Surrounding the bolt 80 and positoned between the spindle 81 and the inside of wall 83 of the hub is a spacer 88 with another spacer 89 located outside of wall 83, the bolt 80 including a shoulder 91.

Surrounding the portion of the bolt 80 which passes through the wall 83 is a journal 93 which cooperates with a bearing 94 mounted in the aperture. Outboard of the journal and between spacer 89 and the journal is a shim 96. The mounting at the other end of bolt 80 is essentially the same except the bolt receives a locking nut locked by a key as illustrated. Hinge 63 is of basically the same structure.

The spindle includes a center ground surface 100 which forms a bearing surface for a spindle bearing assembly. Spaced radially outwardly of the surface portion 100 is the blade root housing 105, which is slightly tapered as shown, and which includes a flange 106. Bolted to the flange 106 is a pitch horn assembly 110 including the housing pitch horn linkage arm 111, an annular seal 112 being provided between the two.

The outboard side of the spindle 81 between the connection to the pin 80 and the bearing surface 100 is formed with a shoulder to receive an annular spacer 117 located inwardly of the pitch horn housing but spaced from the inner wall 118 thereof.

The inner wall 119 of the blade root housing 105 is spaced from the bearing surface 100 and positioned therein is the pitch bearing assembly 120. The bearing assembly includes multiple bearings 121, 122, 123, 124, as shown and an annular hollow spacer 125 between bearing 121 and 122. Inboard of bearing 121 and located in a bore of the pitch horn housing is an annular spacer 127 which bears against bearing 121. There is a spacer between the balls of the ball bearings to allow for flow of lubricant. The entire bearing assembly is held in position by bearing retainer nuts 129, 130 received over the threaded outboard end of the bearing spindle 81, and pinned in place as shown.

A portion of the outboard end of the spindle is hollow as shown at 135 and forms a reservoir for flowable lubricant, transmission oil sealed in the pitch bearing assembly by a boot 140 of appropriate material.

The inner peripheral surface 142 of the boot is mounted on the spindle by a compression clamp 143 which overlaps both the spacer 117 and the spindle. The outer peripheral surface 146 of the boot is mounted by a compression coupling 147 on a flange 148 which is part of the pitch horn housing, the flange being radially outwardly of the location of the inboard junction between the spindle 61 and the spacer 117. Thus, the peripheral surfaces 142 and 146 of the boot are in spaced concentric planes and in radial alignment.

The boot includes wall portion 150 where mounted to the spindle which is thicker in cross-section than the portion 151 mounted on the pitch horn housing flange 148. with the arrangement as described, there is a substantial volume for lubricant, the volume being defined by the chamber outboard of the boot, the space between the pitch horn housing and spacer 117, the bearing and spacer 125, the volume around the end of the bearing spindle and the inner wall of the blade root housing and the chamber inside of the outboard of the spindle, all of which is filled with flowable lubricant. As shown in FIG. 8, the pitch horn housing is provided with fill and vent passages, sealed by plugs 152, the passages communicating with the space between the inside (oil side) of the boot and the opposed face of the pitch horn housing adjacent to the flange 148, i.e. between the bolt passages but essentially in alignment therewith.

With the seal arrangement described, the bearing housing is hermetically sealed and the bearings are operated completely submerged in flowable lubricating oil, e.g. transmission oil. Since the spindle does not move angularly whereas the pitch horn housing and blade root housing are moved in an oscillating angular motion of relating high frequency. The construction of the seal assembly with radial alignment of the surfaces in concentric planes assures that the angular motion produces pure torsional shear deformation of the boot. The result is that there is no wrinkling or chaffing of the elastomeric material of the boot.

After the boot is installed, the substantial volume is completely filled with oil. Any remaining air bubbles are bled through the plugs, which are then tightly sealed. This eliminates air and oxygen from the bearing cavity, thus reducing the tendency towards fretting corrosion. The elastomeric boot also allows for thermal expansion and contraction of the oil and, since the boot is clamped, there can be no "breathing" in and out of moisture and dirt, with changes of temperature or barometric pressure as occurs with conventional running or lip seals. There should be no oil leakage, with the structure described, but should this occur, e.g. puncture by objects, the outside surfaces around the seal, which should normally be dry, will readily show signs of leakage to indicate that a potential problem exists. Due to centrifugal forces, in-flight rupture does not result in loss of lubricant. When the rotor stops, after landing, lubricant oil may flow out through the rupture in the boot and will flow to the cabin top, where it is clearly visible to the pilot.

To illustrate, the helicopter shown in FIGS. 1-3 of this application has a performance specification as shown in the following table.

| PRELIMINARY R-22 HELICOPTER SPECIFICATIONS | |
|---|---|
| Main rotor dia. | 25.17 ft. |
| Disk area | 497.4 sq. ft. |
| Disk loading at 1,230 lb. gross weight | 2.473 psf. |
| Rotor solidity | 030 |
| Blade twist | −8 deg. |
| Flapping angle to stops | ±12 deg. minimum |
| Tip speed at 2,800 engine rpm | 672 fps. |
| Tail rotor dia. | 42 in. |
| Powerplant make & model | Lycoming O-235-C2C |
| Rating (takeoff or continuous) | 115 hp. at 2,800 rpm. |
| Gross weight | 1,230 lb. |
| Empty weight | 720 lb. |
| Fuel weight (17 gal.) and oil | 114 lb. |
| Payload | 396 lb. |
| $V_{NE}$ | 115 mph. |
| Maneuvering load factor | +3.5 −0.5 |
| Landing load factor | +3.5 (landing gear + rotor) |
| Maximum rotor tilt | 12 deg. relative to shaft |
| Performance at Gross Weight: | |
| Cruise airspeed at 75% power and s.l. | 100 mph. |
| Fuel consumption at economy cruise | 15 mpg. |
| Approximate range (no reserve) | 250 mi. |
| Rate of climb at sea level | 1,500 ft./min. |
| Service ceiling | 14,000 ft. |
| Hover ceiling (out of ground effect) | 5,200 ft. |
| Hover ceiling (in ground effect) | 6,500 ft. |

It is possible to use a power plant which is a high performance power plant, for example, a Lycoming O-320(4 cylinder opposed engine rated at 150 horsepower at 2700 rpm at sea level).

The helicopter shown herein has an overall heighth of 8 feet 9 inches, an overall width including the skids of 6 feet 5 inches, and an overall length including the rotors of 28 feet 9 inches. The cabin heighth is 5 feet 8 inches with a width of 3 feet 8 inches.

As will be apparent from the above, the hub structure for a two-bladed helicopter has been simplified in structure, and much improved in operation in a substantial number of ways, as already described.

It will also be apparent to those skilled in the art, that various modifications and changes may be made within the scope of the invention as set forth in the appended claims.

I claim:

1. An underslung rotor structure for a rotorcraft having two rotor blades driven by a rotor shaft, comprising:
    a hub mounted on the rotor shaft for rotation by it and including a teeter hinge having a hinge axis passing perpendicularly through the axis of the rotor shaft to provide tilting movement of said hub relative to the rotor shaft about the axis of said teeter hinge, and further including two coning hinges having axes parallel to the axis of the teeter hinge but located below it and offset from the axis of the rotor shaft for mounting the rotor blades to the hub so as to provide independent substantially unopposed coning movement of each rotor blade relative to said hub so as to balance the aerodynamic forces on each blade with the centrifugal forces on each blade, whereby stick shake is substantially eliminated; and, a friction teeter hinge restraint including an arm on each rotor blade extending inwardly of each coning hinge and having an upper surface curved so as to lie at a substantially constant distance from said teeter hinge axis when the rotor blades are at rest, and a droop stop extending from the rotor shaft to engage said upper surface so that when the rotor blades are at rest teetering of said hub is yieldably opposed by friction between said droop stop and said upper surface and so that when said rotor blades are driven said droop stop is spaced from said upper surface permitting the rotor blades to tilt and cone freely.

2. The underslung rotor structure of claim 1, wherein for a given vertical spacing between said teeter hinge and said coning hinges, said coning hinges are offset from the axis of the rotor shaft a sufficient distance so that the stabilizing centrifugal moment acting on said hub is always greater than the destabilizing moments acting on said hub, whereby said hub is stabilized in all attitudes of the rotorcraft, said stabilizing centrifugal moment being the product of twice the centrifugal force and the displacement between the pitch change axes of the rotor blades, and said destabilizing moments being produced by the offset of the rotor thrust vector from the teeter hinge and by the centrifugal force created by the displacement of the center-of-gravity of the rotor from the center of rotation of the rotor shaft.

3. An improved rotor pitch bearing lubrication system for use with a helicopter blade that is connected to a rotor and is movable in angular relation relative to the hub for changing the pitch of the blade comprising:

means forming an outer blade root housing including a shoulder;

means forming a rotor blade bearing spindle mounted on said rotor for rotation therewith;

said rotor blade bearing spindle including a portion received within said blade housing, a surface spaced from said blade housing, and a cavity in one end thereof forming a reservoir for lubricant;

bearing means mounted in at least a portion of said space between said surface and said blade housing for permitting rotation of said housing relative to said bearing spindle;

a pitch horn housing assembly mounted in sealing relation on said shoulder of said root housing for rotary movement relative to said bearing spindle;

boot means located radially inward of said bearing means to prevent inflight loss of lubricant in the event of boot failure, mounted to effect a seal between said blade housing and said spindle, and including inner and outer coaxial cylindrical sealing faces, the outer coaxial sealing face mounted in a sealing relation to said pitch horn housing assembly and the inner coaxial sealing face mounted in sealing relation to said spindle, whereby said boot is placed in shear in response to relative movement between said pitch horn housing and said spindle; and, flowable lubricant substantially filling the space between said spindle and said blade housing for continuously lubricating said bearing means.

4. An improved oil seal and rotor pitch bearing assembly as set forth in claim 3 wherein the cross-section of said boot is greater where mounted on said spindle than where mounted on said pitch horn housing.

5. An improved oil seal and rotor pitch bearing assembly as set forth in claim 3 further including fill and vent means communicating with said cavity for bleeding air from said cavity, and plug means for sealing said fill and vent means.

6. An improved rotor hub and pitch bearing lubrication system for a rotorcraft having two rotor blades driven by a rotor shaft, comprising:

a hub mounted on the rotor shaft for rotation by it and including a teeter hinge having a hinge axis passing perpendicularly through the axis of the rotor shaft to provide tilting movement of said hub relative to the rotor shaft about the axis of said teeter hinge, and further including two coning hinges having axes parallel to the axis of the teeter hinge but located below it and offset from the axis of the rotor shaft for mounting the rotor blades to the hub and to provide independent substantially unopposed coning movement of each rotor blade relative to said hub so as to balance the aerodynamic forces on each blade with the centrifugal forces on each blade, whereby stick shake is substantially elminated;

a friction teeter hinge restraint including an arm on each rotor blade extending inwardly of each coning hinge and having an upper surface curved so as to lie at a substantially constant distance from said teeter hinge axis when the rotor blades are at rest, and a droop stop extending from the rotor shaft to engage said upper surface so that when the rotor blades are at rest teetering of said hub is yieldably opposed by friction between said droop stop and said upper surface and so that when said rotor blades are driven said droop stop is spaced from said upper surface permitting the rotor blades to tilt and cone freely;

means forming an outer blade root housing including a shoulder;

means forming a rotor blade bearing spindle mounted on said rotor for rotation therewith;

said rotor blade bearing spindle including a portion received within said blade housing, a surface spaced from said blade housing, and a cavity in one end thereof forming a reservoir for lubricant;

bearing means mounted in at least a portion of said space between said surface and said blade housing for permitting rotation of said housing relative to said bearing spindle;

a pitch horn housing assembly mounted in sealing relation on said shoulder of said root housing for rotary movement relative to said bearing spindle;

boot means located radially inward of said bearing means to prevent inflight loss of lubricant in the event of boot failure, mounted to effect a seal between said blade housing and said spindle, and including inner and outer coaxial cylindrical sealing faces, the outer coaxial sealing face mounted in a sealing relation to said pitch horn housing assembly and the inner coaxial sealing face mounted in sealing relation to said spindle, whereby said boot is placed in shear in response to relative movement between said pitch horn housing and said spindle; and, flowable lubricant substantially filling the space between said spindle and said blade housing for continuously lubricating said bearing means.

* * * * *